United States Patent
Jean

(10) Patent No.: US 10,430,117 B2
(45) Date of Patent: Oct. 1, 2019

(54) HOST ACCELERATED OPERATIONS IN MANAGED NAND DEVICES

(71) Applicant: Micron Technology, Inc., Boise, ID (US)

(72) Inventor: Sebastien Andre Jean, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 75 days.

(21) Appl. No.: 15/790,794

(22) Filed: Oct. 23, 2017

(65) Prior Publication Data

US 2019/0121576 A1    Apr. 25, 2019

(51) Int. Cl.
*G06F 12/00* (2006.01)
*G06F 3/06* (2006.01)
*G06F 12/10* (2016.01)

(52) U.S. Cl.
CPC .......... *G06F 3/0659* (2013.01); *G06F 3/0616* (2013.01); *G06F 3/0679* (2013.01); *G06F 12/10* (2013.01); *G06F 2212/1008* (2013.01); *G06F 2212/2022* (2013.01)

(58) Field of Classification Search
None
See application file for complete search history.

(56) References Cited

U.S. PATENT DOCUMENTS

| 2009/0113121 A1 | 4/2009 | Lee et al. |
| 2012/0203980 A1 | 8/2012 | Flynn et al. |
| 2012/0221767 A1* | 8/2012 | Post ............... G06F 13/1673 711/103 |
| 2013/0283125 A1 | 10/2013 | Gladwin et al. |
| 2014/0359395 A1 | 12/2014 | Ellis et al. |
| 2016/0070474 A1* | 3/2016 | Yu ................ G06F 3/0608 711/103 |
| 2019/0065370 A1* | 2/2019 | Kanno ............. G06F 3/0679 |

FOREIGN PATENT DOCUMENTS

WO   WO-2016018234 A1   2/2016

OTHER PUBLICATIONS

"International Application Serial No. PCT/US2018/054981, International Search Report dated Jan. 24, 2019", 16 pgs.
"International Application Serial No. PCT/US2018/054981, Written Opinion dated Jan. 24, 2019", 7 pgs.
Wookhan, Jeong, et al., "Improving Flash Storage Performance by Caching Address Mapping Table in Host Memory", (Jul. 2017), 6 pgs.

* cited by examiner

*Primary Examiner* — John A Lane
(74) *Attorney, Agent, or Firm* — Schwegman Lundberg & Woessner, P.A.

(57) ABSTRACT

Devices and techniques for host accelerated operations in managed NAND devices are described herein. A read request is received at a controller of a NAND device. Here, the read request includes a logical address and a physical address. A a verification component that corresponds to the physical address is retrieved a NAND array of the NAND device. A verification of the read request is computed using the logical address, the physical address, and the verification component. A read operation is then modified based on the verification.

27 Claims, 8 Drawing Sheets

HOST ACCELERATED OPERATIONS IN MANAGED NAND DEVICES

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) can extend adjacent a string of storage cells to form a channel for the storages cells of the string. In the example of a vertical string, the polysilicon structure can be in the form of a vertically extending pillar. In some examples the string can be "folded," and thus arranged relative to a U-shaped pillar. In other examples, multiple vertical structures can be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs can include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
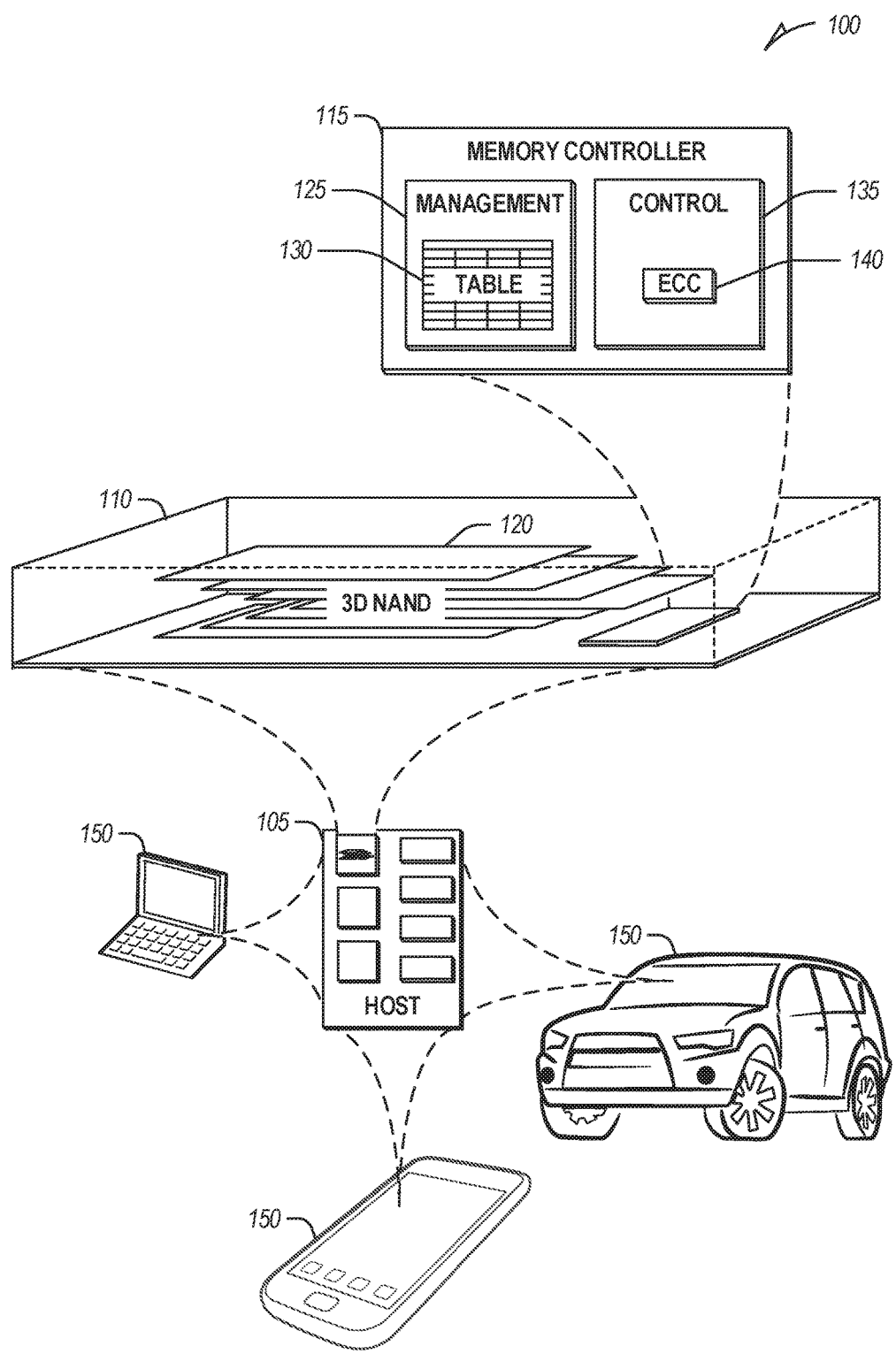
FIG. 1 illustrates an example of an environment including a memory device.

Many storage devices, such as flash devices, use translation tables to map logical elements (e.g., pages or blocks) to the physical equivalents of the logical elements. This allows the controller of the device to perform a variety of technique to increase the performance of, or longevity of, the storage elements of the device. For example, NAND flash cells experience physical wear with write or erase cycles. Further, these devices require many elements to be erased at one time (e.g., block erasure). To address these issues, the controller generally spreads writes around available cells (e.g., to reduce wearing out of these cells) and migrates good pages from blocks to erase the block and thus free additional space. In both cases, a host address for a given page or block can be constant even though the data to which it refers is moved to different physical pages or blocks by virtue of the translation table.

Translation tables are generally loaded into an internal memory of the controller. If the table size is greater than the internal memory (e.g., in random access memory (RAM), such as dynamic RAM (DRAM) or static RAM (SRAM) of the controller, a portion of the table is loaded into the internal memory and the remainder of the table is stored in other storage (such as NAND flash array elements). If a translation request (e.g., a logical-to-physical (L2P) mapping) is not in the internal memory, the controller replaces the internal memory portion of the table with the appropriate portion from other storage. This process can increase latencies when performing operations such as reading or writing to the storage device. Although increased internal memory can reduce these occurrences, this comes at a manufacturing and power cost that can be unacceptable for a given application.

To address the issue of swapping portions of the translation tables into and out of internal memory, the translation tables can be delivered to a host (with presumably greater memory resources than the storage device), allowing the host to indicate which physical address a given operation applies. Such a technique is proposed for the Joint Electron Device Engineering Council (JEDEC) Universal Flash Storage (UFS) version three point zero Host-aware performance booster (HPB) standard, a form of host accelerated operations in managed NAND. In this arrangement, the controller is ultimately responsible for maintaining the translation tables and updating the host with changes to the translation tables, but the host actually provides the controller with the physical addresses to be operated upon. Here, the controller can avoid referencing the translation tables when actually performing an operation, increasing efficiency or decreasing latency when performing the operation.

Current HPB proposals include several drawbacks. For example, the host memory is outside the control of the controller. Thus, manipulations of the L2P mappings by the host can circumvent data protection implemented by the controller. Thus, malicious or defective software of the host can corrupt the data on the storage device in ways not possible when the controller relies solely on its internal translation tables.

What is needed is a technique to exploit the advantages of HPB while also validating data, preventing replay attacks, preventing unauthorized modification of data, and possibly to protect proprietary operations of the storage device, such as wear leveling techniques. These goals can be accomplished by computing a verification of a request using a logical and physical address pair from the request. This verification can be checked against a stored version of the verification to determine whether the verification passes. For example, when a write is performed, the controller will have a L2P map. The controller can hash the logical address and the physical address and store the result. On a subsequent read of the written data, the host provides the logical and physical address from the translation table copy held by the host. The controller can hash the provided logical and physical address to produce a test hash, read the hash stored when the write was performed, and verify that the request is correct when the hashes match. If the hashes do not match, the controller can use the internal translation tables to lookup the correct physical address to the provided logical address and provide the correct data. Thus, the controller implements the performance enhancement of HPB when the provided L2P pair is correct, and gracefully falls back on the traditional translation table lookup when there is a problem (e.g., via mistake or maliciousness).

Additional information can be applied to the verification to provide additional functionality. For example, a sequence number can be hashed with the L2P mapping to prevent replay attacks. Moreover, the actual physical address can themselves be encrypted such that the host provides the encrypted physical address from the translation table provided by the controller. The controller decrypts the physical address to ascertain the actual physical address without reference to the translation tables. In this manner, the controller can obfuscate the internal operation of the L2P mapping from the host to secure proprietary techniques while still enjoying the enhanced performance of HPB. Additional details and examples are described below.

Devices employing the translation table modifications discussed herein can fit in many applications. Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile RAM memory device, such as DRAM, mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touch-screen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 can be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 can be a machine having some portion, or all, of the components discussed in reference to the machine 800 of FIG. 8.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

With respect to translation, the memory controller 115 can implement a technique for HPB. To implement HPB, the memory controller 115 is arranged to receive a read request that includes a logical address and a physical address from the host 105. The host 105 providing the physical address allows the memory controller 115 to avoid reference to L2P mappings internally. In an example, the read request includes a token. Here, the token is a piece of data in additional to the physical address, logical address, or other data present in a traditional read request. In an example, the token is created from a set of inputs that include a seed, the physical address, and the logical address. In an example, the seed is a secret key of the NAND controller. In an example, the token is a hash of the set of inputs. Thus, the token encompasses the elements the uniquely identify an L2P mapping as well as a quantity unknown to the host 105 (e.g., the secret key) to provide additional protection against incorrect L2P mappings from the host 105. In an example, the set of inputs include a counter value. By adding the counter value (e.g., a monotonically increasing or decreasing counter), the token is unique to a particular L2P mapping in time. This can be used to prevent replay attacks by malicious software on the host 105 that can have obtained a L2P mapping token from a previous write. In an example, the counter value is a meta-data sequence number of a NAND array of the NAND device. This provides a benefit of a common counter source across all operations. In an example, as the counter increases, the tokens are updated and communicated to the host 105 (e.g., via a UPIU command response, status message, etc.).

The memory controller 115 is arranged to retrieve a verification component that corresponds to the physical address from the request. The verification component is stored in the NAND array 120. The verification component is a data structure that is used, as described below, to verify that the L2P mapping in the read request is valid (e.g., correct). In an example, the verification component is stored in a block header of a block to which the physical address belongs in the NAND array 120. Thus, if the physical address is a first page in a second block of the NAND array 120, the verification component is stored in the block header for the second block. In an example, the verification component includes a last token that is stored in the NAND array when a NAND array component corresponding to the physical address was last written. In an example, the verification component includes a last logical address that is stored in the NAND array when the NAND array component corresponding to the physical address was last written. These last two examples illustrate that the verification component can change over time, such that a given verification component for a physical address is current until that physical address is re-written (e.g., erased and then written). Thus, the token (e.g., a hash of the physical address and a logical address) verification component will change with each new logical address mapping to the same physical address, or with each new sequence number, seed, etc. even if the L2P mapping has not changed.

The memory controller 115 is arranged to compute a verification of the read request is using the logical address, the physical address, and the verification component. The computed verification is one of pass or fail. In an example, computing the verification includes indicating that the verification passed when the last token is the same as the token from the read request, and that the verification failed otherwise. In this example, the verification component is a token corresponding to the address and stored in the array 120. The verification component token (e.g., last token) is compared to the token included in the request. If they are the same, the verification passes, otherwise the verification fails.

In an example, computing the verification includes indicating that the verification passed when the last logical address is the same as the logical address from the read request, and that the verification failed otherwise. This example allows the omission of the token in the read request and still is able to pair the logical address with the physical address to ascertain whether the request is proper. The technique works because any given write will generally produce a unique combination of logical and physical address as the controller 115 attempts to implement wear leveling, error correction or the like. As the logical address corresponding to the physical address is stored in the array 120 at the time of the write, the logical address provided in the subsequent read request can be compared to the stored logical address. If there is a discrepancy, the verification does not pass.

In an example, computing the verification includes indicating that both the verification passed when the last token is the same as the token from the read request and that the last logical address is the same as the logical address from the read request, and that the verification failed otherwise. This example is a combination of the token and the logical address verification.

The controller 115 is arranged to modify a read operation based on the verification. Here, the read operation is in response to, or to perform, the read request. The modification differs between a passed verification and a failed verification. If the verification failed the HPB read operation is changed to ignore the physical address provided in the read request and to instead use the memory controller's L2P table to map the logical address from the read request to another (e.g., a correct or actual) physical address. It is this correct physical address that the memory controller 115 uses to complete the read request. This technique protects data integrity from malicious or mistaken L2P information from the host 105 without impairing the ability of the device 110 to perform its data storage and retrieval role for the host 105.

In order to efficiently use the storage and bus bandwidth resources, the actual token generating techniques can fall short of true cryptographic security. For example, the hash producing the token can use a cryptographic technique such as SHA-256, but can be adapted to fit in less than 128 bits. In this example, the cryptographic efficacy can be greatly diminished as a typical modern computer can generate every value of a 32-bit space in a short time (e.g., on the order of milliseconds). This can allow an attacker to repeatedly generate and "try" different tokens in the read request until the verification passes even when the provided physical address does not match the provided logical address. To address this problem, in an example, the memory controller 115 is arranged to delay completion of the read request. The delay is a memory controller 115 imposed latency. The delay can be fixed or can change or time or number of failed verifications (e.g., attempts to guess the token). In an example, delaying completion of the read request includes increasing a delay based on a history of failed verifications. Adding the delay increases the cost on a malicious actor to "guess" the correct token, making such a brute force attack generally impractical.

If the verification passes, the memory controller 115 is arranged to complete the read request using the physical address provided in the read request without consulting its own version of the L2P table. Thus, HPB is implemented, modifying the traditional read operation in which the L2P mapping maintained by the memory controller 115 is always referenced.

The above operations of the memory controller 115 demonstrate use of a token or logical and physical address pairings to determine whether the host 105 requests are valid. The memory controller 115 can also provide the data necessary to the host to perform valid read requests. For example, the memory controller 115 is arranged to generate the token, provide L2P mappings, or updated translation tables to the host 105 after, for example, a write operation that is either requested by the host 105 or otherwise (e.g., a write performed as part of device 110 maintenance such as garbage collecting, error correction, etc.). Accordingly, the memory controller 115 is arranged to receive a write request (with a logical address that is the target of the write) for a physical address, compute the verification component for the write request from the logical address, and perform the write request (e.g., write operation). Here, as part of the write operation, the memory controller 115 is arranged to also write the verification component to the NAND array 120. Thus, as the write is performed, the verification component is generated and stored, available for read verifications in the future. In an example, the verification component itself is not stored, but rather the token, or other elements used to compute the verification component. Thus, a smaller value (e.g., the token) may be stored to save space at the cost of recalculating the verification component for each read request. In an example, the memory controller 115 is arranged to return, to a requester of the write request (e.g., the host 105 or an application running thereon), the token computed as part of computing the verification. The requester is then responsible for using the correct token for subsequent requests.

A disadvantage of sharing the translation tables with an outside entity, such as the host 105, is the possible disclosure of propriety techniques, such as wear leveling. For example, by observing changing logical and physical address relationships over time, the host 105 can determine a pattern to the physical address selected, timing of internal data moves, etc. It is not possible, however, to simply refrain from sharing these updates with the host 105 because the host 105 will provide incorrect physical addresses in its requests, resulting in data corruption or the need for the memory controller 115 to fall back on its own L2P mapping to determine the correct physical address.

A technique to address this problem involves providing an external physical address to the host 105 that is different than, but allows derivation to, the actual physical address (e.g., an internal physical address). Thus, in an example, the physical address provided in the read request is an external physical address configured to produce an internal physical address under an operation. Here, the internal physical address represents a set of NAND array components (e.g., cells, pages, blocks, die, etc.). In an example, the operation is decryption with a key of the memory controller 115. Thus, the physical address delivered to the host 105 is encrypted with a key known only to the memory controller 115. When the host 105 provides that physical address in its requests, the memory controller 115 decrypts the external physical address with the key to produce the internal physical address. This technique obfuscates the actual physical address relationships of the array 120, while still avoiding having to resort to L2P mapping lookups because the simple decryption operation provides the relationship between the external physical address and the internal physical address. In an example, the external physical address is periodically re-encrypted with a variance stored by the memory controller 115. In an example, the variance may not be stored, but instead take the form of a session key, session seed, or the like. These examples result in a changed external physical address to the same internal physical address. Such a technique further obfuscates the relationship between the external physical address and internal physical address. In an example, the memory controller 115 is arranged to transmit an updated L2P table in a status message in response to the changed external physical address. In an example, the status message is part of a return for a request from a host 105. Updating the host 105 of changes to the translation tables allows the HPB efficiencies described above. Providing the updates in response to host 105 requests can provide a convenient signaling mechanism already implemented by HPB capable hosts.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory can have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things. In an example, the management tables 103 may include translation tables or a L2P mapping.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, can be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB can include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or can require different amounts of metadata associated therewith. For example, different memory device types can have different bit error rates, which can lead to different amounts of metadata necessary to ensure integrity of the page of data (e.g., a memory device with a higher bit error rate can require more bytes of error correction code data than a memory device with a lower bit error rate). As an example, a multi-level cell (MLC) NAND flash device can have a higher bit error rate than a corresponding single-level cell (SLC) NAND flash device. As such, the MLC device can require more metadata bytes for error data than the corresponding SLC device.

Figure 2:
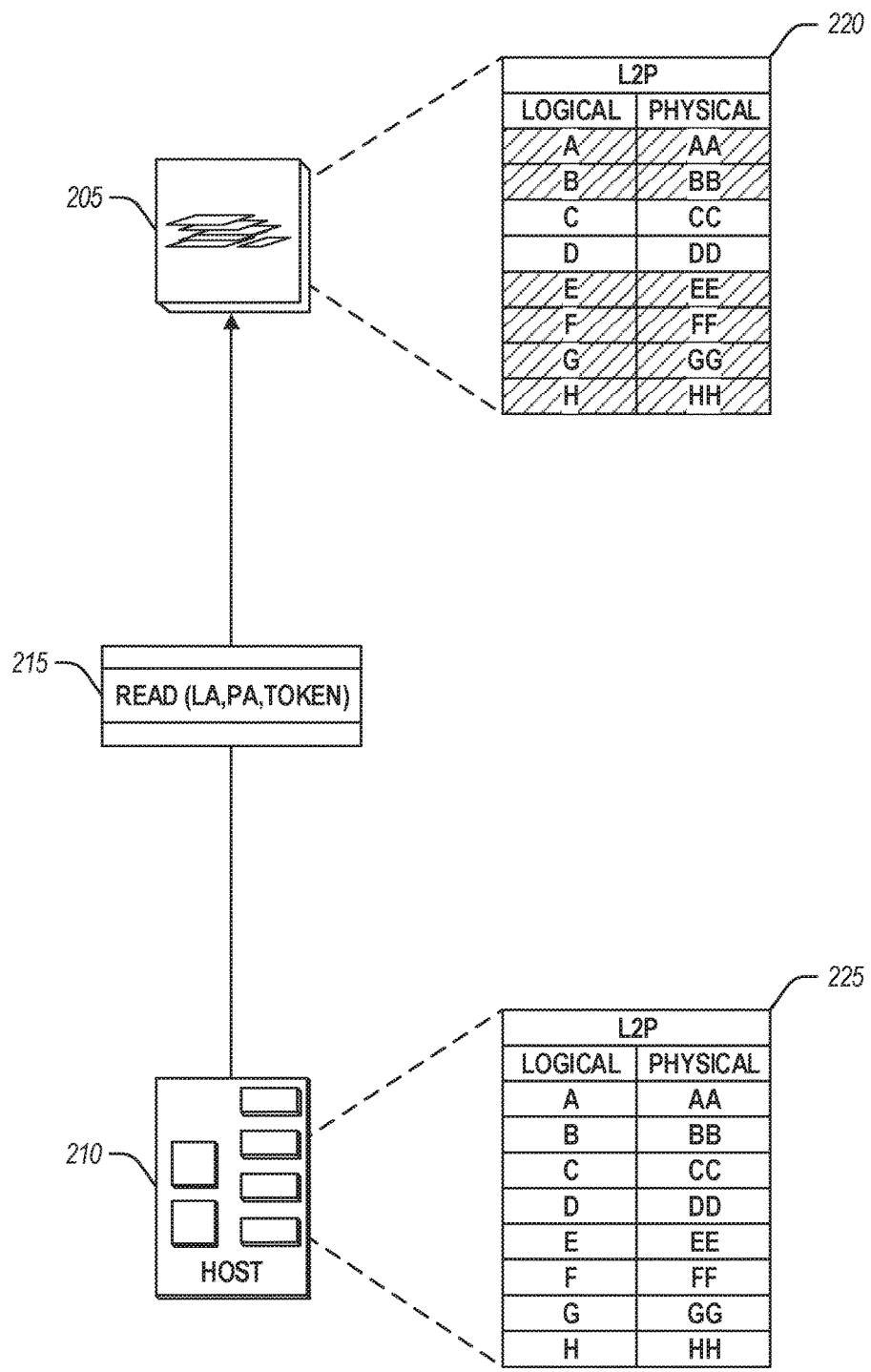
FIG. 2 illustrates an example of performing a read request.

FIG. 2 illustrates an example of performing a read request. As illustrated, the host 210 includes a completely available copy of the translation table 225 for L2P mapping.

The memory device 205 includes the same translation table 220, except that only a portion of the translation table 220 is available to the memory device 205. The shaded mappings of the translation table 220 are not presently available to (e.g., loaded into the RAM of) the memory device 110, but are rather stored in slower storage (e.g., NAND cells) of the memory device 205.

As illustrated, the host 210 is making a read request 215 that includes all of a logical address (LA), physical address (PA)—which was determined by reference to the translation table 225, and a token. The token may be kept in the translation table 225 or in another location under the direction of the host 105. In the illustrated example, the memory device 205 uses the information in the read request to verify the correctness of the request—e.g., that the LA and PA match, that the token matches a token stored with the PA, or both—and perform the read without referencing the translation table 220. In this scenario, if the read was for logical address 'A', the above operations would reduce processing in performing the read because the memory device 205 would not have to load the shaded portion of translation table 220 into working memory (e.g., RAM) in order to determine that data at physical address 'AA' was being read.

Figure 3:
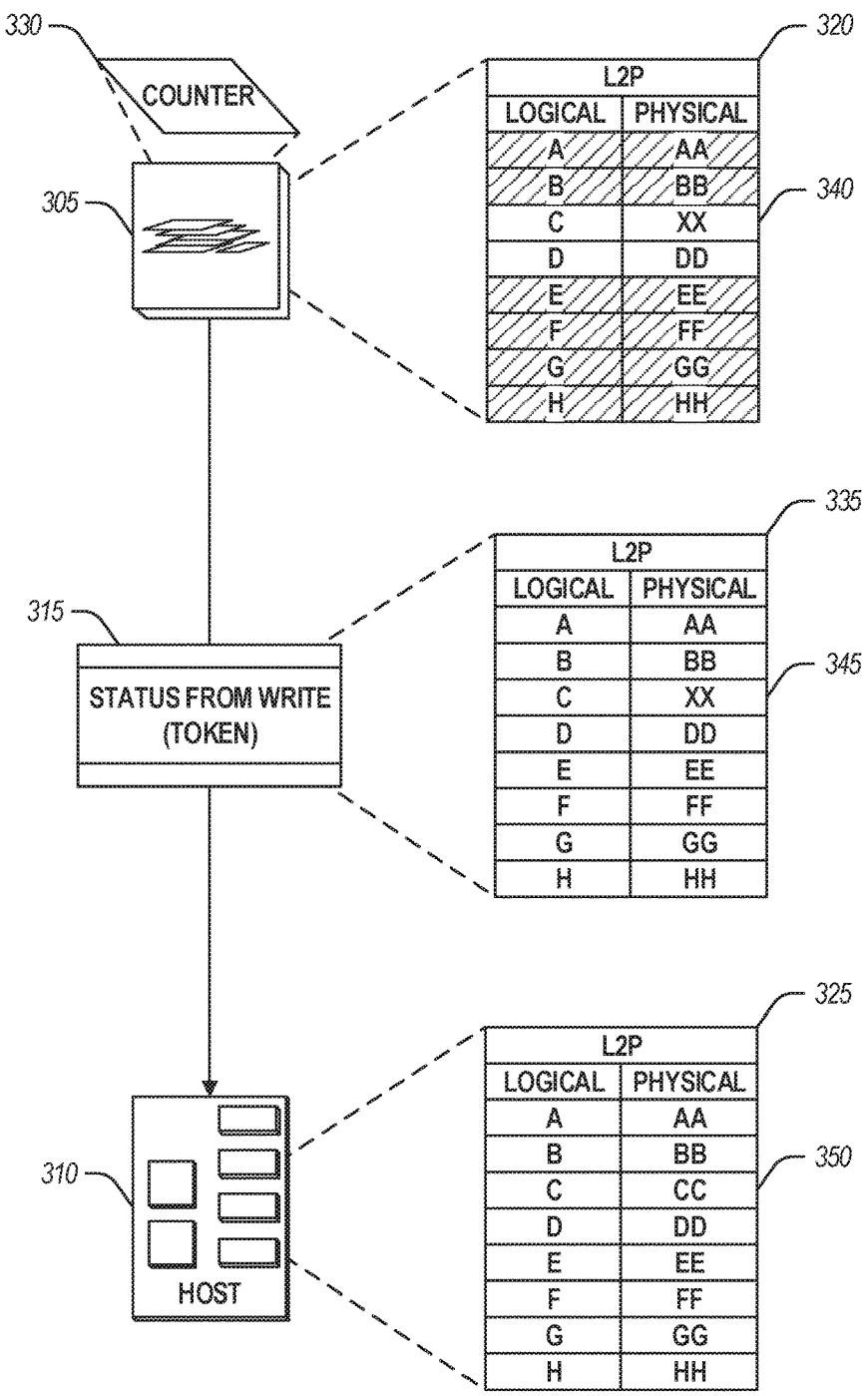
FIG. 3 illustrates an example of performing a write request.

FIG. 3 illustrates an example of performing a write request. Here, the memory device 305 has updated the physical address of logical address 'C' to 'XX'. This change is reflected in translation table 320 at element 340. However, the corresponding element 350 of translation table 325 held by the host 310 does not yet reflect the correct mapping (e.g., the translation table 325 is stale). To correct this, the memory device 305 provides a duplicate translation table 335 with the corrected entry 345 to the host 310 via a status message 315 produced in response to the write request. The host 310 can then update its translation table 325 for future requests.

As noted above, the memory device 305 can generate a token that corresponds to the updated entry 340. This token is also transmitted in the status request when, for example, it is not included in the translation table 335. In an example, a counter 330 of the memory device 305 is used in generating the token. As noted above, this can defend against replay attacks of the token scheme.

Figure 4:
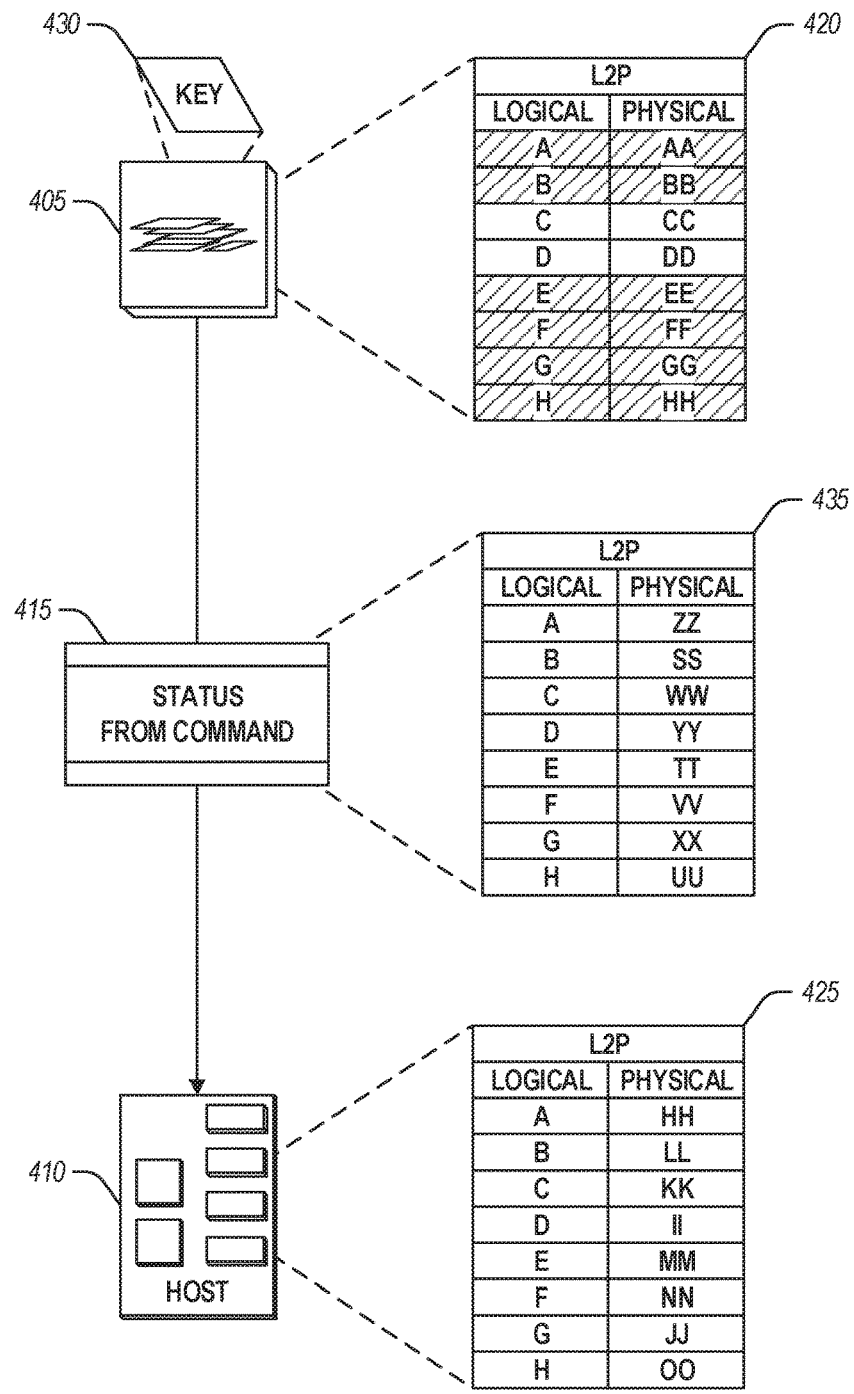
FIG. 4 illustrates an example of encrypting physical addresses.

FIG. 4 illustrates an example of encrypting physical addresses. Here, the translation table 420 of the memory device 405 includes internal physical address to logical address mappings and the translation table 425 of the host 410 includes external physical address to the same logical address mappings. The memory device 405 communicates the external physical address mappings via in the table 435 via a status message 415 or other memory device 405 to host 410 communication. As noted above, to avoid lookups to the local translation table 420, the external physical addresses can be used by the memory device 405 to directly derive the internal physical addresses. A technique to accomplish this direct derivation is to symmetrically encrypt the internal physical addresses of the table 420 with a key 430 held by the memory device 405. The encrypted addresses are communicated to the host 410 in the update table 435. The host 410 never decrypts the external physical addresses, but rather uses them in accordance with HPB to indicate to which physical address an operation pertains. The memory device 405 then uses the key 430 to decrypt the external physical address in a request (e.g., a read or write request), the decrypted form of the external physical address being the internal physical address.

This technique may be augmented with a seed, different key, etc., over time to provide different external addresses for the same internal physical address. As long as the internal derivation elements (e.g., the key, sequence number, random seed, etc.) are synchronized with the host translation table 425, the memory device 405 can directly derive the internal physical addresses from the external physical addresses provided by the host 405. Thus, as illustrated, the internal physical address for logical address 'C' in the table 420 is 'CC'. A previous encryption of the address 'CC' yielded 'KK' as shown for logical address 'C' in table 425. However, a change in the derivation elements (e.g., a changed key, new seed, etc.) has now caused 'CC' to encrypt to 'WW' for logical element 'C', which is being communicated to the host 405 in the status message 415 in table 435. Once received, the table 435 will be used by the host 405 to update its own table 425 for future requests.

Figure 5A:
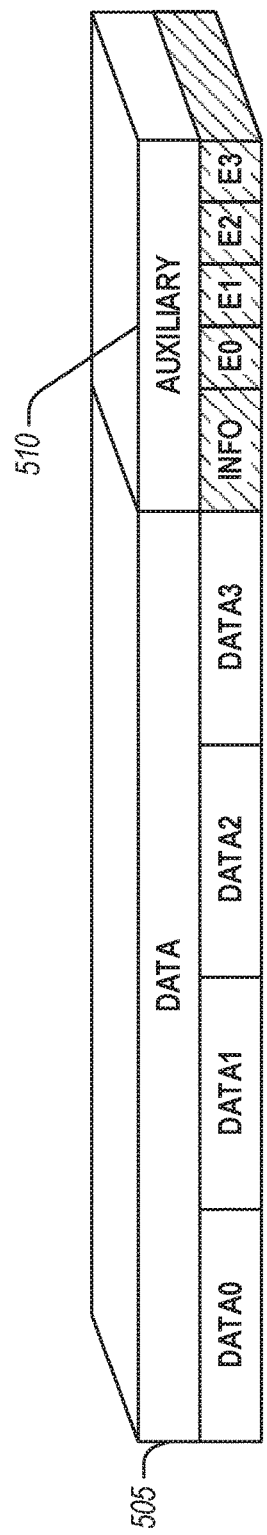
FIGS. 5A-5B illustrate storage configurations for token data.
Figure 5B:
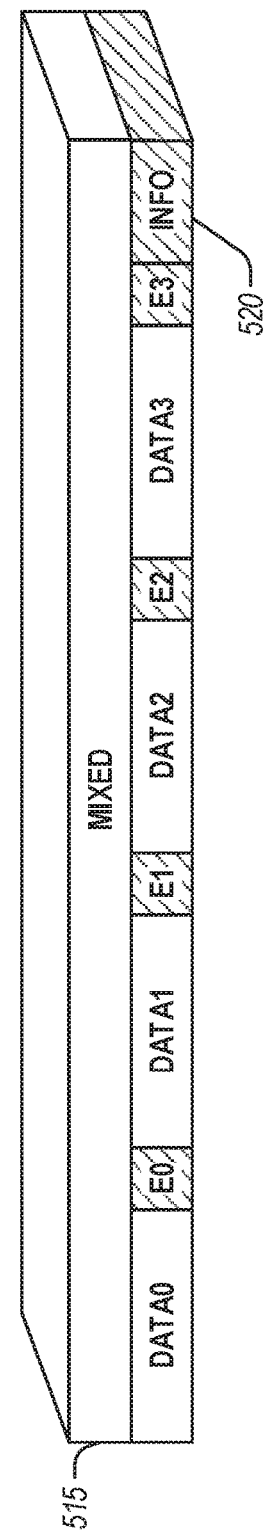

FIGS. 5A-5B illustrate storage configurations for a verification component in a page. FIG. 5A illustrates an organization where a dedicated portion of the page is set-aside for controller metadata. Thus, the page is divided in the user data portion 505 and the auxiliary bytes portion 510. The verification component can be stored in the auxiliary bytes portion, such as in the segment marked "INFO." In contrast, FIG. 5B illustrates an alternative organization in which the auxiliary bytes are interspersed throughout the use data segments, resulting in a heterogeneous portion 515. However, the "INFO" auxiliary bytes 520 are still located on the page and can store the verification component of the page when it was last written. Other locations that may be used to store verification components include block headers, or areas of the memory device reserved for device management. However, an advantage of storing the verification component in a page include read efficiency. To perform the verification, the controller of the memory device reads the verification component. If the controller is to perform the read, the controller then reads the data corresponding to the read. This double reading can be eliminated when the verification component is read at the same time that the data is read. Thus, the controller reads the data, as if it were to not performing the verification, into a buffer. The verification component is also read during this operation (e.g., the entire page 505 is read at one time including the user data 505 and the auxiliary data 510). The controller then performs the verification and releases the buffered user data when the verification passes, avoid additional reads in this scenario. If the verification does not pass, the controller will perform additional reads, at least to read data at the correct physical address after reference to its own translation table, to satisfy the request. This scenario, however, is no less efficient than a standard non HPB operation, and would be expected only when the request is generated by malfunctioning or malicious entities.

Figure 6:
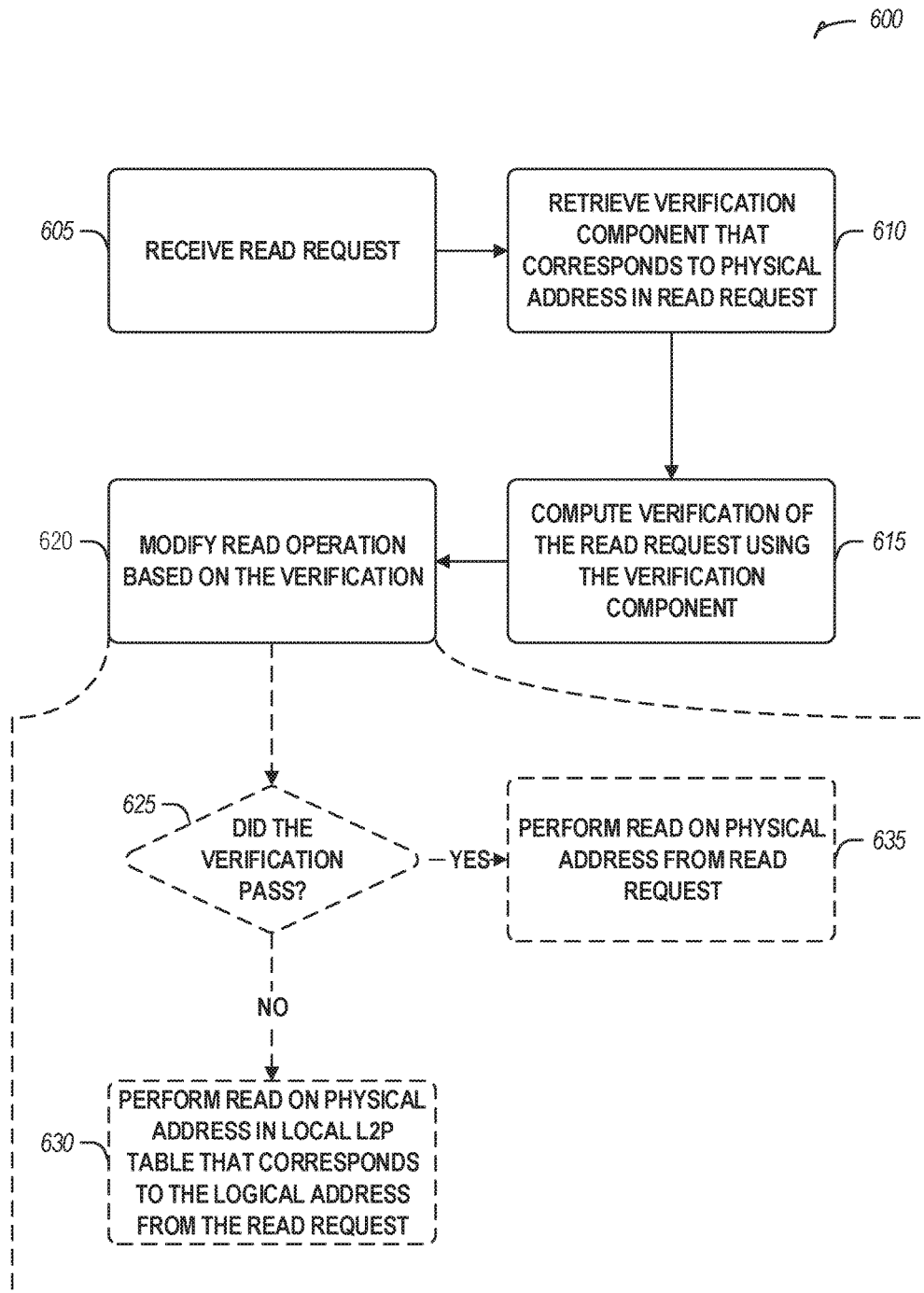
FIG. 6 illustrates a flowchart of a method for HPB in managed NAND devices.

FIG. 6 illustrates a flowchart of a method 600 for HPB in managed NAND devices. The operations of the method 600 are performed by electronic hardware, such as that described above and below (e.g., circuitry).

At operation 605, a read request is received at a controller of a NAND device. Here, the read request includes a logical address and a physical address. In an example, the read request includes a token. In an example, the token is created from a set of inputs that include a seed, the physical address, and the logical address. In an example, the seed is a secret key of the NAND controller. In an example, the token is a hash of the set of inputs. In an example, the set of inputs include a counter value. In an example, the counter value is a meta-data sequence number of a NAND array of the NAND device.

At operation 610, a verification component that corresponds to the physical address is retrieved from the NAND array. In an example, the verification component is stored in a block header of a block to which the physical address belongs in the NAND array. In an example, the verification component includes a last token that is stored in the NAND array when a NAND array component corresponding to the physical address was last written. In an example, the verification component includes a last logical address that is stored in the NAND array when the NAND array component corresponding to the physical address was last written.

At operation 615, a verification of the read request is computed using the logical address, the physical address, and the verification component. In an example, computing the verification includes indicating that the verification passed when the last token is the same as the token from the read request, and that the verification failed otherwise. In an example, computing the verification includes indicating that the verification passed when the last logical address is the same as the logical address from the read request, and that the verification failed otherwise. In an example, computing the verification includes indicating that both the verification passed when the last token is the same as the token from the read request and that the last logical address is the same as the logical address from the read request, and that the verification failed otherwise.

At operation 620, a read operation is modified based on the verification. For example, at decision 625 an evaluation of whether the verification passed or failed is made. If the verification failed, at operation 630, modifying the read operation includes using a L2P table of the NAND controller to map the logical address from the read request to a second physical address, and completing the read request using the second physical address. In an example, completing the read request includes delaying completion of the read request. In an example, delaying completion of the read request includes increasing a delay based on a history of failed verifications.

If the verification of decision 625 passed, at operation 635, modifying the read operation includes completing the read request using the physical address without consulting the L2P table of the NAND controller.

The method 600 can be extended to include receiving a write request (with a logical address that is the target of the write) at the NAND controller for the physical address, computing the verification component for the write request from the logical address, and performing the write request including writing the verification component to the NAND array. In an example, the method 600 includes an operation of returning, to a requester of the write request, a token computed as part of computing the verification.

In an example, the physical address is an external physical address configured to produce an internal physical address under an operation. Here, the internal physical address represents a set of NAND array components. In an example, the operation is decryption with a key of the NAND controller. In an example, the external physical address is periodically re-encrypted with a variance stored by the NAND controller. This results in a changed external physical address to the internal physical address. In an example, an updated L2P table is transmitted in a status message in response to the changed external physical address. Here, the status message is part of a return for a request to the NAND device from a host.

Figure 7:
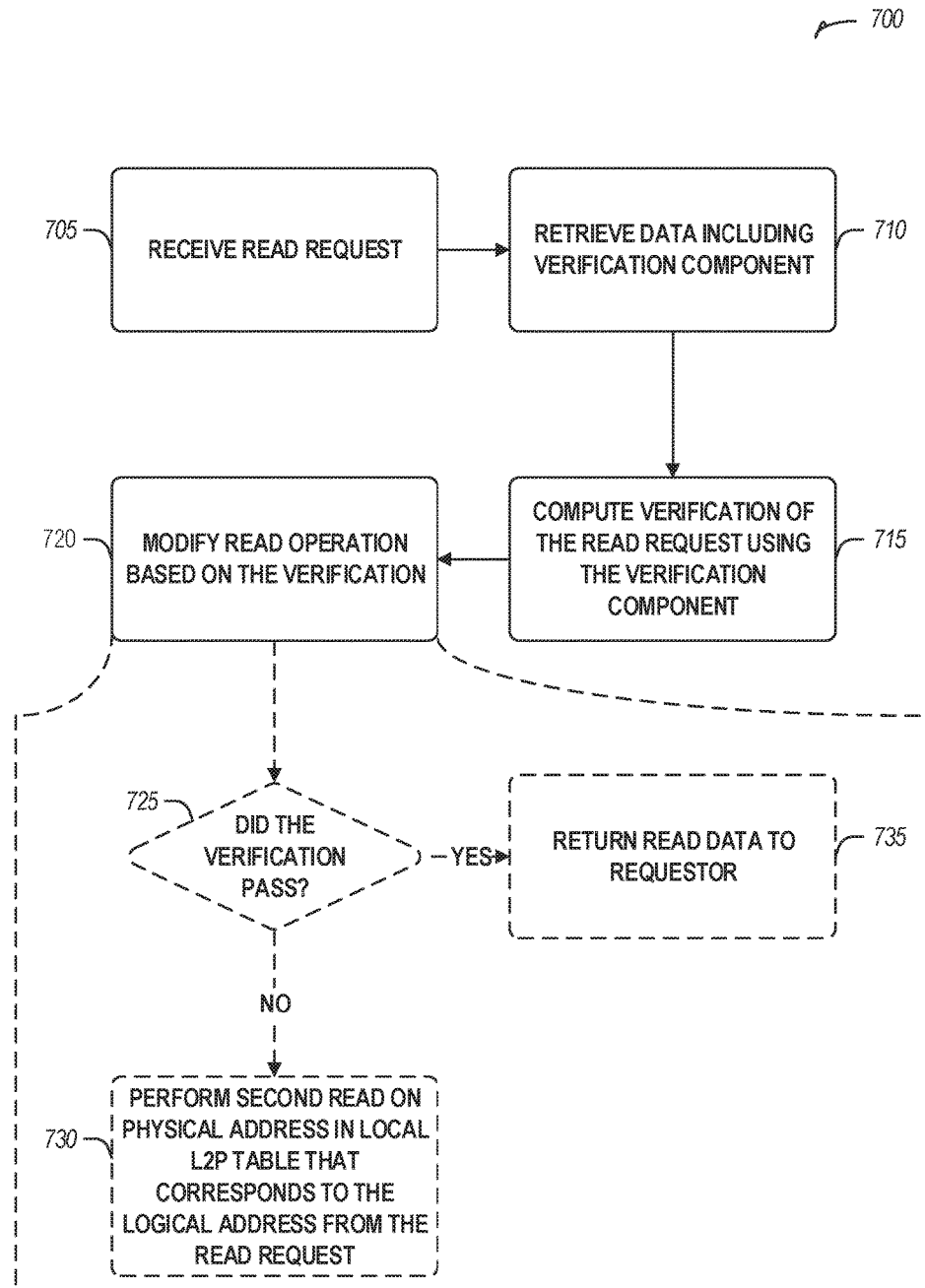
FIG. 7 illustrates a flowchart of a method 700 for host accelerated operations in managed NAND devices.

FIG. 7 illustrates a flowchart of a method 700 for host accelerated operations in managed NAND devices. The operations of the method 700 are performed by electronic hardware, such as that described above and below (e.g., circuitry).

The operations of the method 700 are similar to those of the method 600 described above. A difference is the amount of data read when the verification component is retrieved. Thus, when a read request is received (operation 705), the data specified in the read request (e.g., without using the L2P mapping of the NAND device) is read along with the verification component (operation 710). The verification component is used to compute the verification of the read request (operation 715), the result of which modifies the read operation (operation 720). The read request verification is test (decision 725). When it passes, the already read data is returned to the requester. If, however, the verification does not pass, the L2P table of the NAND device is consulted for the actual physical address that corresponds to the logical address in the read request, and the data is re-read from the correct physical address, and then returned to the requester (operation 730). An advantage of this technique is a reduction in latency when the read request is valid, which is generally the likely outcome of the test (decision 725).

Figure 8:
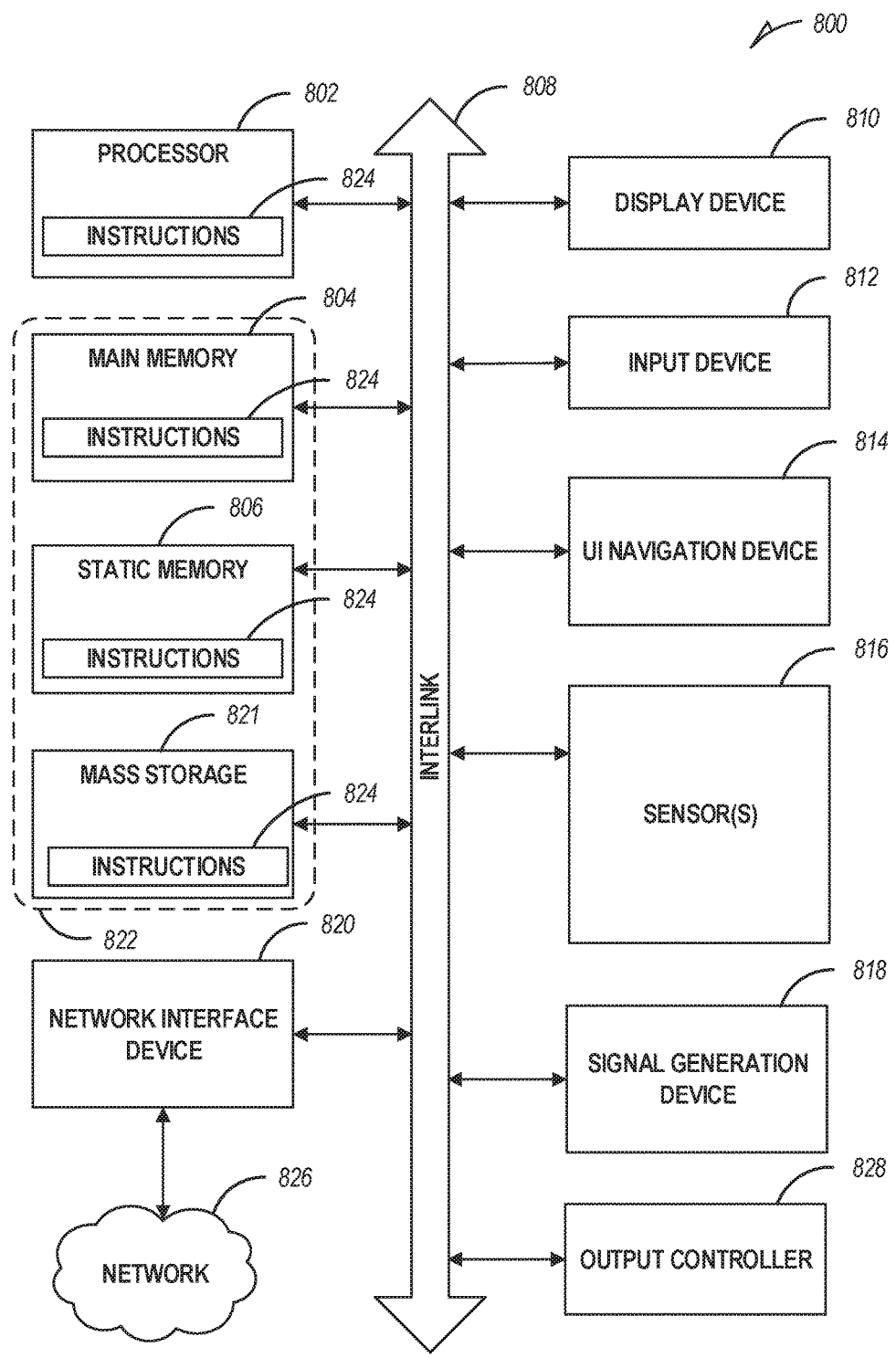
FIG. 8 is a block diagram illustrating an example of a machine upon which one or more embodiments can be implemented.

FIG. 8 illustrates a block diagram of an example machine 800 upon which any one or more of the techniques (e.g., methodologies) discussed herein can perform. In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate by, logic, components, devices, packages, or mechanisms. Circuitry is a collection (e.g., set) of circuits implemented in tangible entities that include hardware (e.g., simple circuits, gates, logic, etc.). Circuitry membership can be flexible over time and underlying hardware variability. Circuitries include members that can, alone or in combination, perform specific tasks when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

The machine (e.g., computer system) 800 (e.g., the host device 105, the memory device 110, etc.) can include a hardware processor 802 (e.g., a central processing unit (CPU), a graphics processing unit (GPU), a hardware processor core, or any combination thereof, such as the memory controller 115, etc.), a main memory 804 and a static memory 806, some or all of which can communicate with each other via an interlink (e.g., bus) 808. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 816, a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 can include a machine readable medium 822 on which is stored one or more sets of data structures or instructions 824 (e.g., software) embodying or utilized by any one or more of the techniques or functions described herein. The instructions 824 can also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 can constitute the machine readable medium 822.

While the machine readable medium 822 is illustrated as a single medium, the term "machine readable medium" can include a single medium or multiple media (e.g., a centralized or distributed database, or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 (e.g., software, programs, an operating system (OS), etc.) or other data are stored on the storage device 821, can be accessed by the memory 804 for use by the processor 802. The memory 804 (e.g., DRAM) is typically fast, but volatile, and thus a different type of storage than the storage device 821 (e.g., an SSD), which is suitable for long-term storage, including while in an "off" condition. The instructions 824 or data in use by a user or the machine 800 are typically loaded in the memory 804 for use by the processor 802. When the memory 804 is full, virtual space from the storage device 821 can be allocated to supplement the memory 804; however, because the storage 821 device is typically slower than the memory 804, and write speeds are typically at least twice as slow as read speeds, use of virtual memory can greatly reduce user experience due to storage device latency (in contrast to the memory 804, e.g., DRAM). Further, use of the storage device 821 for virtual memory can greatly reduce the usable lifespan of the storage device 821.

In contrast to virtual memory, virtual memory compression (e.g., the Linux® kernel feature "ZRAM") uses part of the memory as compressed block storage to avoid paging to the storage device 821. Paging takes place in the compressed block until it is necessary to write such data to the storage device 821. Virtual memory compression increases the usable size of memory 804, while reducing wear on the storage device 821.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 824 can further be transmitted or received over a communications network 826 using a transmission medium via the network interface device 820 utilizing any one of a number of transfer protocols (e.g., frame relay, internet protocol (IP), transmission control protocol (TCP), user datagram protocol (IJDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software.

ADDITIONAL EXAMPLES

Example 1 is a NAND device for host accelerated operations in managed NAND devices, the NAND device comprising: a NAND array; and a controller to: receive a read request that includes, a logical address and a physical address; retrieve, from the NAND array, a verification component that corresponds to the physical address; compute a verification of the read request using the logical address, the physical address, and the verification component; modify a read operation based on the verification.

In Example 2, the subject matter of Example 1 includes, wherein the verification component includes a last logical address that is stored in the NAND array when a NAND array component corresponding to the physical address was last written.

In Example 3, the subject matter of Example 2 includes, wherein, to compute the verification, the controller indicates that the verification passed when the last logical address is the same as the logical address from the read request, and indicates that the verification failed otherwise.

In Example 4, the subject matter of Examples 1-3 includes, wherein the read request includes a token.

In Example 5, the subject matter of Example 4 includes, wherein the verification component includes a last token that is stored in the NAND array when a NAND array component corresponding to the physical address was last written.

In Example 6, the subject matter of Example 5 includes, wherein, to compute the verification, the controller indicates that the verification passed when the last token is the same as the token from the read request, and indicates that the verification failed otherwise.

In Example 7, the subject matter of Examples 5-6 includes, wherein the verification component includes a last logical address that is stored in the NAND array when the NAND array component corresponding to the physical address was last written.

In Example 8, the subject matter of Example 7 includes, wherein, to compute the verification, the controller indicates that the verification passed when the last token is the same as the token from the read request and that the last logical address is the same as the logical address from the read request, and indicates that the verification failed otherwise.

In Example 9, the subject matter of Examples 4-8 includes, wherein the token is created from a set of inputs that include a seed, the physical address, and the logical address.

In Example 10, the subject matter of Example 9 includes, wherein the seed is a secret key of the NAND device.

In Example 11, the subject matter of Examples 9-10 includes, wherein the token is a hash of the set of inputs.

In Example 12, the subject matter of Examples 9-11 includes, wherein the set of inputs include a counter value.

In Example 13, the subject matter of Example 12 includes, wherein the counter value is a meta-data sequence number for the NAND array.

In Example 14, the subject matter of Examples 1-13 includes, wherein the controller is further to: receive a write request at the NAND device for the physical address, the write request including a logical address; compute the verification component for the write request from the logical address; and perform the write request including writing the verification component to the NAND array.

In Example 15, the subject matter of Example 14 includes, wherein the controller is further to return, to a requester of the write request, a token computed as part of computing the verification.

In Example 16, the subject matter of Examples 1-15 includes, the verification component is stored in a block header of a block to which the physical address belongs in the NAND array of the NAND device.

In Example 17, the subject matter of Examples 1-16 includes, wherein the physical address is an external physical address configured to produce an internal physical address under an operation, the internal physical address representing a set of NAND array components.

In Example 18, the subject matter of Example 17 includes, wherein the operation is decryption with a key of the NAND device.

In Example 19, the subject matter of Example 18 includes, wherein the external physical address is periodically re-encrypted with a variance stored by the NAND device, resulting in a changed external physical address to the internal physical address.

In Example 20, the subject matter of Example 19 includes, wherein the controller is further to transmit an updated logical-to-physical (L2P) table in a status message in response to the changed external physical address, the status message being part of a return for a request to the NAND device from a host.

In Example 21, the subject matter of Examples 1-20 includes, wherein, to modify the read operation based on the verification, when the verification indicates it has failed, the controller is to: use a logical-to-physical (L2P) table of the NAND device to map the logical address from the read request to a second physical address; and complete the read request using the second physical address.

In Example 22, the subject matter of Example 21 includes, wherein, to complete the read request, the controller delays completion of the read request.

In Example 23, the subject matter of Example 22 includes, wherein, to delay completion of the read request, the controller increases a delay based on a history of failed verifications.

In Example 24, the subject matter of Examples 1-23 includes, wherein, to modify the read operation based on the verification, when the verification indicates it has passed, the controller completes the read request using the physical address without consulting a logical-to-physical (L2P) table of the NAND device.

Example 25 is a method for host accelerated operations in managed NAND devices, the method comprising: receiving a read request at a controller of a NAND device, the read request including a logical address and a physical address; retrieving, from a NAND array of the NAND device, a verification component that corresponds to the physical address; computing a verification of the read request using the logical address, the physical address, and the verification component; modifying a read operation based on the verification.

In Example 26, the subject matter of Example 25 includes, wherein the verification component includes a last logical address that is stored in the NAND array when a NAND array component corresponding to the physical address was last written.

In Example 27, the subject matter of Example 26 includes, wherein computing the verification includes indicating that the verification passed when the last logical address is the same as the logical address from the read request, and indicating that the verification failed otherwise.

In Example 28, the subject matter of Examples 25-27 includes, wherein the read request includes a token.

In Example 29, the subject matter of Example 28 includes, wherein the verification component includes a last token that is stored in the NAND array when a NAND array component corresponding to the physical address was last written.

In Example 30, the subject matter of Example 29 includes, wherein computing the verification includes indicating that the verification passed when the last token is the same as the token from the read request, and indicating that the verification failed otherwise.

In Example 31, the subject matter of Examples 29-30 includes, wherein the verification component includes a last logical address that is stored in the NAND array when the NAND array component corresponding to the physical address was last written.

In Example 32, the subject matter of Example 31 includes, wherein computing the verification includes indicating that the verification passed when the last token is the same as the token from the read request and that the last logical address is the same as the logical address from the read request, and indicating that the verification failed otherwise.

In Example 33, the subject matter of Examples 28-32 includes, wherein the token is created from a set of inputs that include a seed, the physical address, and the logical address.

In Example 34, the subject matter of Example 33 includes, wherein the seed is a secret key of the NAND controller.

In Example 35, the subject matter of Examples 33-34 includes, wherein the token is a hash of the set of inputs.

In Example 36, the subject matter of Examples 33-35 includes, wherein the set of inputs include a counter value.

In Example 37, the subject matter of Example 36 includes, wherein the counter value is a meta-data sequence number for the NAND array.

In Example 38, the subject matter of Examples 25-37 includes, receiving a write request at the NAND controller for the physical address, the write request including a logical address; computing the verification component for the write request from the logical address; and performing the write request including writing the verification component to the NAND array.

In Example 39, the subject matter of Example 38 includes, returning, to a requester of the write request, a token computed as part of computing the verification.

In Example 40, the subject matter of Examples 25-39 includes, the verification component is stored in a block header of a block to which the physical address belongs in the NAND array of the NAND device.

In Example 41, the subject matter of Examples 25-40 includes, wherein the physical address is an external physical address configured to produce an internal physical address under an operation, the internal physical address representing a set of NAND array components.

In Example 42, the subject matter of Example 41 includes, wherein the operation is decryption with a key of the NAND controller.

In Example 43, the subject matter of Example 42 includes, wherein the external physical address is periodically re-encrypted with a variance stored by the NAND controller, resulting in a changed external physical address to the internal physical address.

In Example 44, the subject matter of Example 43 includes, transmitting an updated logical-to-physical (L2P) table in a status message in response to the changed external physical address, the status message being part of a return for a request to the NAND device from a host.

In Example 45, the subject matter of Examples 25-44 includes, wherein modifying the read operation based on the verification, when the verification indicates it has failed, includes: using a logical-to-physical (L2P) table of the NAND controller to map the logical address from the read request to a second physical address; and completing the read request using the second physical address.

In Example 46, the subject matter of Example 45 includes, wherein completing the read request includes delaying completion of the read request.

In Example 47, the subject matter of Example 46 includes, wherein delaying completion of the read request includes increasing a delay based on a history of failed verifications.

In Example 48, the subject matter of Examples 25-47 includes, wherein modifying the read operation based on the verification, when the verification indicates it has passed, includes completing the read request using the physical address without consulting a logical-to-physical (L2P) table of the NAND controller.

Example 49 is at least one machine readable medium including instructions that, when executed by processing circuitry, cause the processing circuitry to perform any method of Examples 25 through 48.

Example 50 is a device comprising means to perform any method of Examples 25 through 48.

Example 51 is at least one computer readable medium including instructions for host accelerated operations in managed NAND devices, the instructions, when executed by processing circuitry, cause the processing circuitry to perform operations comprising: receiving a read request at a controller of a NAND device, the read request including a logical address and a physical address; retrieving, from a NAND array of the NAND device, a verification component that corresponds to the physical address; computing a verification of the read request using the logical address, the physical address, and the verification component; modifying a read operation based on the verification.

In Example 52, the subject matter of Example 51 includes, wherein the verification component includes a last logical address that is stored in the NAND array when a NAND array component corresponding to the physical address was last written.

In Example 53, the subject matter of Example 52 includes, wherein computing the verification includes indicating that the verification passed when the last logical address is the same as the logical address from the read request, and indicating that the verification failed otherwise.

In Example 54, the subject matter of Examples 51-53 includes, wherein the read request includes a token.

In Example 55, the subject matter of Example 54 includes, wherein the verification component includes a last token that is stored in the NAND array when a NAND array component corresponding to the physical address was last written.

In Example 56, the subject matter of Example 55 includes, wherein computing the verification includes indicating that the verification passed when the last token is the same as the token from the read request, and indicating that the verification failed otherwise.

In Example 57, the subject matter of Examples 55-56 includes, wherein the verification component includes a last logical address that is stored in the NAND array when the NAND array component corresponding to the physical address was last written.

In Example 58, the subject matter of Example 57 includes, wherein computing the verification includes indicating that the verification passed when the last token is the same as the token from the read request and that the last logical address is the same as the logical address from the read request, and indicating that the verification failed otherwise.

In Example 59, the subject matter of Examples 54-58 includes, wherein the token is created from a set of inputs that include a seed, the physical address, and the logical address.

In Example 60, the subject matter of Example 59 includes, wherein the seed is a secret key of the NAND controller.

In Example 61, the subject matter of Examples 59-60 includes, wherein the token is a hash of the set of inputs.

In Example 62, the subject matter of Examples 59-61 includes, wherein the set of inputs include a counter value.

In Example 63, the subject matter of Example 62 includes, wherein the counter value is a meta-data sequence number for the NAND array.

In Example 64, the subject matter of Examples 51-63 includes, wherein the operations further comprise: receiving a write request at the NAND controller for the physical address, the write request including a logical address; computing the verification component for the write request from the logical address; and performing the write request including writing the verification component to the NAND array.

In Example 65, the subject matter of Example 64 includes, wherein the operations further comprise returning, to a requester of the write request, a token computed as part of computing the verification.

In Example 66, the subject matter of Examples 51-65 includes, the verification component is stored in a block header of a block to which the physical address belongs in the NAND array of the NAND device.

In Example 67, the subject matter of Examples 51-66 includes, wherein the physical address is an external physical address configured to produce an internal physical address under an operation, the internal physical address representing a set of NAND array components.

In Example 68, the subject matter of Example 67 includes, wherein the operation is decryption with a key of the NAND controller.

In Example 69, the subject matter of Example 68 includes, wherein the external physical address is periodically re-encrypted with a variance stored by the NAND controller, resulting in a changed external physical address to the internal physical address.

In Example 70, the subject matter of Example 69 includes, wherein the operations further comprise transmitting an updated logical-to-physical (L2P) table in a status message in response to the changed external physical address, the status message being part of a return for a request to the NAND device from a host.

In Example 71, the subject matter of Examples 51-70 includes, wherein modifying the read operation based on the verification, when the verification indicates it has failed, includes: using a logical-to-physical (L2P) table of the NAND controller to map the logical address from the read request to a second physical address; and completing the read request using the second physical address.

In Example 72, the subject matter of Example 71 includes, wherein completing the read request includes delaying completion of the read request.

In Example 73, the subject matter of Example 72 includes, wherein delaying completion of the read request includes increasing a delay based on a history of failed verifications.

In Example 74, the subject matter of Examples 51-73 includes, wherein modifying the read operation based on the verification, when the verification indicates it has passed, includes completing the read request using the physical address without consulting a logical-to-physical (L2P) table of the NAND controller.

Example 75 is a system for host accelerated operations in managed NAND devices, the system comprising: means for receiving a read request at a controller of a NAND device, the read request including a logical address and a physical address; means for retrieving, from a NAND array of the NAND device, a verification component that corresponds to the physical address; means for computing a verification of the read request using the logical address, the physical address, and the verification component; means for modifying a read operation based on the verification.

In Example 76, the subject matter of Example 75 includes, wherein the verification component includes a last logical address that is stored in the NAND array when a NAND array component corresponding to the physical address was last written.

In Example 77, the subject matter of Example 76 includes, wherein the means for computing the verification include means for indicating that the verification passed when the last logical address is the same as the logical address from the read request, and means for indicating that the verification failed otherwise.

In Example 78, the subject matter of Examples 75-77 includes, wherein the read request includes a token.

In Example 79, the subject matter of Example 78 includes, wherein the verification component includes a last token that is stored in the NAND array when a NAND array component corresponding to the physical address was last written.

In Example 80, the subject matter of Example 79 includes, wherein the means for computing the verification include means for indicating that the verification passed when the last token is the same as the token from the read request, and means for indicating that the verification failed otherwise.

In Example 81, the subject matter of Examples 79-80 includes, wherein the verification component includes a last logical address that is stored in the NAND array when the NAND array component corresponding to the physical address was last written.

In Example 82, the subject matter of Example 81 includes, wherein the means for computing the verification include means for indicating that the verification passed when the last token is the same as the token from the read request and that the last logical address is the same as the logical address from the read request, and means for indicating that the verification failed otherwise.

In Example 83, the subject matter of Examples 78-82 includes, wherein the token is created from a set of inputs that include a seed, the physical address, and the logical address.

In Example 84, the subject matter of Example 83 includes, wherein the seed is a secret key of the NAND controller.

In Example 85, the subject matter of Examples 83-84 includes, wherein the token is a hash of the set of inputs.

In Example 86, the subject matter of Examples 83.85 includes, h the set of inputs include a counter value.

In Example 87, the subject matter of Example 86 includes, wherein the counter value is a meta-data sequence number for the NAND array.

In Example 88, the subject matter of Examples 75-87 includes, means for receiving a write request at the NAND controller for the physical address, the write request including a logical address; means for computing the verification component for the write request from the logical address; and means for performing the write request including writing the verification component to the NAND array.

In Example 89, the subject matter of Example 88 includes, means for returning, to a requester of the write request, a token computed as part of computing the verification.

In Example 90, the subject matter of Examples 75-89 includes, the verification component is stored in a block header of a block to which the physical address belongs in the NAND array of the NAND device.

In Example 91, the subject matter of Examples 75-90 includes, wherein the physical address is an external physical address configured to produce an internal physical address under an operation, the internal physical address representing a set of NAND array components.

In Example 92, the subject matter of Example 91 includes, wherein the operation is decryption with a key of the NAND controller.

In Example 93, the subject matter of Example 92 includes, wherein the external physical address is periodically re-encrypted with a variance stored by the NAND controller, resulting in a changed external physical address to the internal physical address.

In Example 94, the subject matter of Example 93 includes, means for transmitting an updated logical-to-physical (L2P) table in a status message in response to the changed external physical address, the status message being part of a return for a request to the NAND device from a host.

In Example 95, the subject matter of Examples 75-94 includes, wherein the means for modifying the read operation based on the verification, when the verification indicates it has failed, include: means for using a logical-to-physical (L2P) table of the NAND controller to map the logical address from the read request to a second physical address; and means for completing the read request using the second physical address.

In Example 96, the subject matter of Example 95 includes, wherein the means for completing the read request include means for delaying completion of the read request.

In Example 97, the subject matter of Example 96 includes, wherein the means for delaying completion of the read request include means for increasing a delay based on a history of failed verifications.

In Example 98, the subject matter of Examples 75-97 includes, wherein the means for modifying the read operation based on the verification, when the verification indicates it has passed, include means for completing the read request using the physical address without consulting a logical-to-physical (L2P) table of the NAND controller.

Example 99 is at least one machine-readable medium including instructions that, when executed by processing circuitry, cause the processing circuitry to perform operations to implement of any of Examples 1-98.

Example 100 is an apparatus comprising means to implement of any of Examples 1-98.

Example 101 is a system to implement of any of Examples 1-98.

Example 102 is a method to implement of any of Examples 1-98.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure can be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but can instead be generally perpendicular to the surface of the substrate, and can form an acute angle with the surface of the substrate (e.g., between 60 and 120 degrees, etc.).

In some embodiments described herein, different doping configurations can be applied to a source-side select gate (SGS), a control gate (CG), and a drain-side select gate (SGD), each of which, in this example, can be formed of or at least include polysilicon, with the result such that these tiers (e.g., polysilicon, etc.) can have different etch rates when exposed to an etching solution. For example, in a process of forming a monolithic pillar in a 3D semiconductor device, the SGS and the CG can form recesses, while the SGD can remain less recessed or even not recessed. These doping configurations can thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell can be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device can be configured to provide wear cycle information to the memory device with each memory operation. The memory device control circuitry (e.g., control logic) can be programmed to compensate for memory device performance changes corresponding to the wear cycle information. The memory device can receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements can be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMS), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A NAND device for host accelerated operations in managed NAND devices, the NAND device comprising:
    a NAND array, and a controller to:
receive a read request that includes a logical address, a physical address, and a token;
retrieve, from the NAND array, a verification component that corresponds to the physical address;
compute a verification of the read request using the logical address, the physical address, and the verification component; and
modify a read operation based on the verification.

2. The NAND device of claim 1, wherein the verification component includes a last logical address that is stored in the NAND array when a NAND array component corresponding to the physical address was last written.

3. The NAND device of claim 2, wherein, to compute the verification, the controller indicates that the verification passed when the last logical address is the same as the logical address from the read request, and indicates that the verification failed otherwise.

4. The NAND device of claim 1, wherein the verification component includes a last token that is stored in the NAND array when a NAND array component corresponding to the physical address was last written.

5. The NAND device of claim 4, wherein the verification component includes a last logical address that is stored in the NAND array when the NAND array component corresponding to the physical address was last written.

6. The NAND device of claim 5, wherein, to compute the verification, the controller indicates that the verification passed when the last token is the same as the token from the read request and that the last logical address is the same as the logical address from the read request, and indicates that the verification failed otherwise.

7. The NAND device of claim 1, wherein the controller is further to:
receive a write request at the NAND device for the physical address, the write request including a logical address;
compute the verification component for the write request from the logical address; and
perform the write request including writing the verification component to the NAND array.

8. The NAND device of claim 7, wherein the controller is further to return, to a requester of the write request, the token computed as part of computing the verification.

9. The NAND device of claim 1, wherein, to modify the read operation based on the verification, when the verification indicates it has failed, the controller is to:
use a logical-to-physical (L2P) table of the NAND device to map the logical address from the read request to a second physical address; and
complete the read request using the second physical address.

10. A method for host accelerated operations in managed NAND devices, the method comprising:
receiving a read request at a controller of a NAND device, the read request including a logical address, a physical address, and a token;
retrieving, from a NAND array of the NAND device, a verification component that corresponds to the physical address;
computing a verification of the read request using the logical address, the physical address, and the verification component; and
modifying a read operation based on the verification.

11. The method of claim 10, wherein the verification component includes a last logical address that is stored in the NAND array when a NAND array component corresponding to the physical address was last written.

12. The method of claim 11, wherein computing the verification includes indicating that the verification passed when the last logical address is the same as the logical address from the read request, and indicating that the verification failed otherwise.

13. The method of claim 10, wherein the verification component includes a last token that is stored in the NAND array when a NAND array component corresponding to the physical address was last written.

14. The method of claim 13, wherein the verification component includes a last logical address that is stored in the NAND array when the NAND array component corresponding to the physical address was last written.

15. The method of claim 14, wherein computing the verification includes indicating that the verification passed when the last token is the same as the token from the read request and that the last logical address is the same as the logical address from the read request, and indicating that the verification failed otherwise.

16. The method of claim 10, comprising:
receiving a write request at the NAND controller for the physical address, the write request including a logical address;
computing the verification component for the write request from the logical address; and
performing the write request including writing the verification component to the NAND array.

17. The method of claim 16, comprising returning, to a requester of the write request, the token computed as part of computing the verification.

18. The method of claim 10, wherein modifying the read operation based on the verification, when the verification indicates it has failed, includes:
using a logical-to-physical (L2P) table of the NAND controller to map the logical address from the read request to a second physical address; and
completing the read request using the second physical address.

19. At least one non-transitory computer readable medium including instructions for host accelerated operations in managed NAND devices, the instructions, when executed by processing circuitry, cause the processing circuitry to perform operations comprising:
receiving a read request at a controller of a NAND device, the read request including a logical address, a physical address, and a token;
retrieving, from a NAND array of the NAND device, a verification component that corresponds to the physical address;
computing a verification of the read request using the logical address, the physical address, and the verification component; and
modifying a read operation based on the verification.

20. The computer readable medium of claim 19, wherein the verification component includes a last logical address that is stored in the NAND array when a NAND array component corresponding to the physical address was last written.

21. The computer readable medium of claim 20, wherein computing the verification includes indicating that the verification passed when the last logical address is the same as the logical address from the read request, and indicating that the verification failed otherwise.

22. The computer readable medium of claim 19, wherein the verification component includes a last token that is stored in the NAND array when a NAND array component corresponding to the physical address was last written.

23. The computer readable medium of claim 22, wherein the verification component includes a last logical address that is stored in the NAND array when the NAND array component corresponding to the physical address was last written.

24. The computer readable medium of claim 23, wherein computing the verification includes indicating that the verification passed when the last token is the same as the token from the read request and that the last logical address is the same as the logical address from the read request, and indicating that the verification failed otherwise.

25. The computer readable medium of claim 19, wherein the operations further comprise:
   receiving a write request at the NAND controller for the physical address, the write request including a logical address;
   computing the verification component for the write request from the logical address; and
   performing the write request including writing the verification component to the NAND array.

26. The computer readable medium of claim 25, wherein the operations further comprise returning, to a requester of the write request, the token computed as part of computing the verification.

27. The computer readable medium of claim 19, wherein modifying the read operation based on the verification, when the verification indicates it has failed, includes:
   using a logical-to-physical (L2P) table of the NAND controller to map the logical address from the read request to a second physical address; and
   completing the read request using the second physical address.

* * * * *